(12) United States Patent
Wada et al.

(10) Patent No.: US 7,040,327 B2
(45) Date of Patent: May 9, 2006

(54) DIE CLEANING METHOD

(75) Inventors: Yukihisa Wada, Nagoya (JP); Takahisa Kaneko, Nagoya (JP); Masayuki Nate, Nagoya (JP)

(73) Assignee: NGK Insulators, LTD, Nagoya (JP)

( * ) Notice: Subject to any disclaimer, the term of this patent is extended or adjusted under 35 U.S.C. 154(b) by 0 days.

(21) Appl. No.: 10/506,970

(22) PCT Filed: Jan. 31, 2003

(86) PCT No.: PCT/JP03/01032

§ 371 (c)(1),
(2), (4) Date: Sep. 8, 2004

(87) PCT Pub. No.: WO03/082487

PCT Pub. Date: Oct. 9, 2003

(65) Prior Publication Data

US 2005/0126596 A1 Jun. 16, 2005

(30) Foreign Application Priority Data

Mar. 28, 2002 (JP) .............................. 2002-090581

(51) Int. Cl.
*B08B 7/00* (2006.01)
(52) U.S. Cl. ........................... 134/22.1; 134/5; 134/19; 134/42

(58) Field of Classification Search .................... 134/5, 134/19, 42, 22.1
See application file for complete search history.

(56) References Cited

U.S. PATENT DOCUMENTS 3,084,075 A * 4/1963 Doan et al. .................... 134/8

FOREIGN PATENT DOCUMENTS

| JP | A 63-282305 | | 11/1988 |
|----|-------------|---|---------|
| JP | A 3-19906   | | 1/1991  |
| JP | 06322162 A  | * | 11/1994 |
| JP | A 8-27615   | | 1/1996  |
| JP | WO 00/68159 | | 11/2000 |

* cited by examiner

*Primary Examiner*—Zeinab El-Arini
(74) *Attorney, Agent, or Firm*—Oliff & Berridge, PLC

(57) ABSTRACT

There is disclosed a die cleaning method for removing a forming-material from a die used in forming the forming-material containing a binder, comprising the steps of: removing a part or all of the binder contained in the forming-material from the die; and removing the forming-material from the die, whereby the forming-material in the die can be removed without damaging or deforming the die for use in forming the forming-material containing the binder.

6 Claims, 1 Drawing Sheet

DIE CLEANING METHOD

TECHNICAL FIELD

The present invention relates to a method of cleaning a die for use in forming a forming-material containing a binder, particularly to a die cleaning method which is capable of removing a forming-material in a die without damaging or deforming the die.

BACKGROUND ART

When formed bodies having predetermined shapes are formed, a method is generally used in which dies including openings having the predetermined shapes are attached to a tip of an extruder to perform extrusion forming, but the openings of the dies are sometimes clogged with foreign matters, hard soil and the like, and the dies need to be periodically cleaned. Especially when formed bodies having structures including a large number of thin ribs, such as honeycomb structures, are formed, the dies include fine slits for forming the ribs, space portions such as the fine slits are easily clogged with the foreign matters, and the foreign matters are not easily removed.

As a forming-material for use in this forming, clay obtained by adding an organic binder and the like to particulate matters such as ceramic and metal is generally used. Therefore, when the dies for use in the forming using the clay as a raw material are cleaned, the space portions of the dies are mainly clogged with the clay, and the clay needs to be removed. To clean the dies, for example, a washing method by high-pressure water and the like are used, but when the die has a complicated structure or a material of the die is brittle, defects such as breakage and deformation are easily generated at the time of the washing at a high pressure. The defects are easily generated especially in the die having a structure including a large number of fine slits. There has also been a problem that the die cannot be sufficiently cleaned, when the pressure of washing water is lowered in order to prevent the defects. Therefore, there has been a demand for a die cleaning method in which defects at the time of cleaning are not easily generated and a die can be sufficiently cleaned.

DISCLOSURE OF THE INVENTION

The present invention has been developed in consideration of such circumstances, and an object thereof is to provide a die cleaning method in which breakage or deformation of a die does not easily occur.

According to the present invention, there is provided a die cleaning method for removing a forming-material from a die used in forming the forming-material containing a binder, characterized by comprising the steps of: removing a part or all of the binder contained in the forming-material from the die; and removing the forming-material from the die. In the present invention, the step of removing a part or all of the binder is preferably performed by heating the die, and a heating temperature is further preferably in a range of 200 to 500° C. The step of removing the forming-material is preferably performed by spraying a fluid to the die at a pressure of 40 kg/cm$^2$ or less. The die preferably includes a member constituted of cemented carbide, and the die preferably includes a member having slits.

BEST MODE FOR CARRYING OUT THE INVENTION

The present invention will be described hereinafter in detail based on a concrete embodiment, but the present invention is not limited to the following embodiment.

Figure 1:
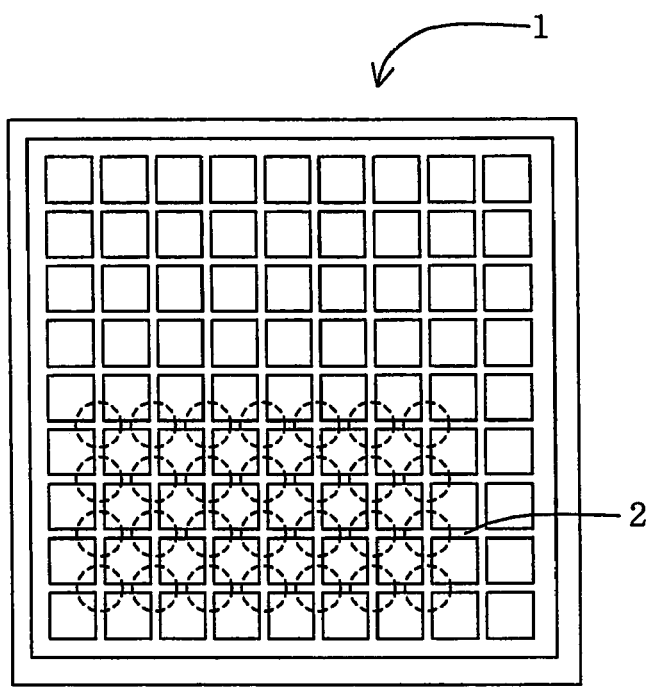
FIG. 1 is a plan view schematically showing a die according to the present invention.
Figure 2:
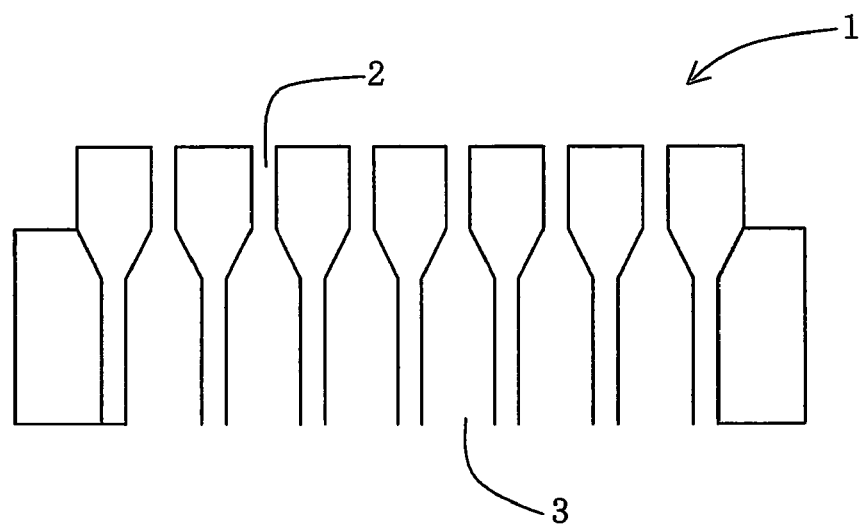
FIG. 2 is a sectional view schematically showing a section of the die according to the present invention.

A die which is an object of a cleaning method of the present invention is a die used in forming a forming-material containing a binder. As an example of the die, a plan view of the die for use in forming a formed body having a honeycomb shape is shown in FIG. 1, and a sectional view is shown in FIG. 2. Since the honeycomb shape includes a large number of partition walls for partitioning through channels, a die for forming the shape includes a member having a large number of slits 2. As important characteristics, the present invention includes steps in which after removing a part or all of the binder contained in the forming-material attached to a die 1, for example, the forming-material in space portions 3 or the slits 2, the forming-material is removed. When a part or all of the binder is first removed in this manner, a bonding force for bonding the forming-materials to each other is weakened, and the forming-material attached to the die can be easily removed.

The binder contained in the forming-material has an effect of bonding main components of the forming-material to each other in such a manner that a predetermined shape can be held after the forming, and polymeric materials, waxes and the like are generally used. As concrete examples, a cellulose-based material such as methyl cellulose, an acrylic material such as polymethyl methacrylate, olefin-based homopolymer or copolymer such as PE and EVA, polystyrene, POM, starch, paraffin wax and the like are used, and about 5 to 15 parts by mass of the binder is added to 100 parts by mass of the main components.

A method of removing a part or all of the binder in this manner is not especially restricted, but, for example, the die is preferably heated to remove the binder. When the above-described binder components are heated, they are decomposed and/or burnt, and removed as gas in many cases. A heating temperature depends on the type of the binder for use. However, when the heating temperature is excessively low, the binder cannot be sufficiently removed. Therefore, the binder components are preferably heated at a temperature which is not less than a decomposition temperature of a resin or a depolymerization starting temperature. On the other hand, when the heating temperature is excessively high, the die is undesirably deformed. A concrete preferable temperature range is 200 to 500° C. Moreover, a heating time is not especially restricted, and may be set to such an extent that a desired amount of binder, that is, a forming-material can be easily removed in a subsequent step of removing the forming-material, but a heating time of, for example, about 4 to 24 hours is effective. Furthermore, a heating atmosphere is not especially restricted, but an oxidizing atmosphere such as atmospheric air is preferable because the burning or the decomposing can be promoted.

Next, a remaining forming-material is removed. As main components of the forming-material, for example, particulate ceramics or metals are generally used. Therefore, after the desired amount of binder is removed, the remaining forming-material can be easily removed. In a preferable removing method, fluids such as water and air are sprayed to the die in the air or water. In this method, the forming-material inside the fine slits 2 shown in FIG. 2 can be also easily removed. A pressure in spraying the fluid to the die is preferably low in order to prevent the defect such as the breakage of the die from being generated, and in the present invention, the material can be sufficiently removed even at a low pressure. Concretely, a pressure is preferably 40 kg/cm$^2$ or less, further preferably 30 kg/cm$^2$ or less, and especially preferably 20 kg/cm$^2$ or less. On the other hand, when the pressure is excessively low, the die cannot be sufficiently cleaned even by the present invention in some case, and therefore a pressure of 3 kg/cm$^2$ or more is preferable. Air is preferably sprayed in water.

The present invention can be applied, even when the die is formed of any material other than steel or alloy, but, for example, cemented carbide is superior in resistance to heat or wear, but is brittle as compared with the steel. Therefore, an iron-based material such as steel does not break because of redistribution of stress by plastic deformation, even when a pressure not less than a designed value is applied. However, the brittle material like cemented carbide does not cause plastic deformation, and easily breaks. Therefore, the application of the present invention to the cleaning of the die including a member formed of cemented carbide is preferable in that the effect of the present invention can be fulfilled more clearly. Here, cemented carbide is obtained by compressing/forming and subsequently sintering, at a high temperature, hard metal carbide compound particulates of transition metal element series such as tungsten carbide, titanium carbide, and tantalum carbide by use of iron group metals such as cobalt and nickel having high tenacity as binding materials.

The shape of the die to which the present invention is applied is not especially restricted, but the die having a shape including the fine slits 2 shown in FIG. 1 is suitable for the application of the present invention because the effect of the present invention is more easily fulfilled. Especially dies for use in extrusion-forming formed bodies having honeycomb shapes are preferable as the dies to which the present invention is applied, because many slits are disposed at short intervals.

Next, the present invention will be further concretely described based on examples.

EXAMPLE 1

Clay containing 75% by mass of silicon carbide powder and 25% by mass of metal silicon powder as main components, and containing methyl cellulose and hydroxypropoxyl methyl cellulose which were 10 parts by mass of organic binders with respect to 100 parts by mass of main components in total was prepared as a forming-material, and the forming-material was extruded/formed into a formed body having a honeycomb shape using a die made of cemented carbide having a shape shown in FIG. 1. The die used here was heated at 250° C. for ten hours under the atmosphere to remove the binder. Next, air was sprayed to the die at a pressure of 4 kg/cm$^2$ in the air to remove the forming-material.

EXAMPLES 2, 3

Dies were cleaned in the same manner as described in Example 1 except that forming-materials were removed on conditions shown in Table 1.

COMPARATIVE EXAMPLES 1 TO 3

Dies were cleaned in the same manner as described in Examples 1 to 3 except that a step of heating the die to remove a binder was not performed.

COMPARATIVE EXAMPLE 4

A die was cleaned in the same manner as described in Comparative Example 3 except that a water pressure for washing was set to 80 kg/cm$^2$.

Results are shown in Table 1, the methods of Examples 1 to 3 were capable of removing all the forming-materials attached to the insides of the dies to clean the dies well, whereas the methods of Comparative Examples 1 to 3 were not capable of cleaning up the forming-materials, and the method of Comparative Example 4 was capable of removing the forming-material, but pressure was excessively high, and therefore the die broke.

TABLE 1

| | Binder removing step | Forming-material removing step | | Degree of Removal | Breakage of die |
|---|---|---|---|---|---|
| | | Method | Pressure (kg/cm$^2$) | | |
| Example 1 | Present | Air spraying | 4 | Satisfactory | None |
| Example 2 | Present | Air spraying in water | 4 | Satisfactory | None |
| Example 3 | Present | Water spraying | 20 | Satisfactory | None |
| Comp. Example 1 | None | Air spraying | 4 | Incapable of removing | None |
| Comp. Example 2 | None | Air spraying in water | 4 | Incapable of removing | None |
| Comp. Example 3 | None | Water spraying | 20 | Incapable of removing | None |
| Comp. Example 4 | None | Water spraying | 80 | Satisfactory | Present |

EXAMPLES 4 TO 11

A die similar to that used in Example 1 was used, binders were removed on conditions shown in Table 2, and forming-materials were removed on the conditions of Example 1. The methods of Examples 4 and 5 in which the heating was performed on the conditions at 150° C. for five and ten hours were not capable of sufficiently removing the binders used here. The methods of Examples 6 to 11 in which the heating was performed on the temperature conditions at 200 to 500° C. were capable of removing the forming-materials well, and the dies did not break or deform.

TABLE 2

| | Heating temp. (° C.) | Heating time (hr) | Degree of removal | Presence/absence of deformation |
|---|---|---|---|---|
| Example 4 | 150 | 5 | incapable of removing | None |
| Example 5 | 150 | 10 | incapable of removing | None |
| Example 6 | 200 | 5 | Satisfactory | None |
| Example 7 | 200 | 10 | Satisfactory | None |

TABLE 2-continued

| | Heating temp. (° C.) | Heating time (hr) | Degree of removal | Presence/ absence of deformation |
|---|---|---|---|---|
| Example 8 | 300 | 5 | Satisfactory | None |
| Example 9 | 300 | 10 | Satisfactory | None |
| Example 10 | 500 | 5 | Satisfactory | None |
| Example 11 | 500 | 10 | Satisfactory | None |

INDUSTRIAL APPLICABILITY

As described above, when a die cleaning method of the present invention is used, a forming-material can be easily removed from a die without breakage or deformation, and the die can be sufficiently cleaned. Therefore, the present invention can be used effectively in cleaning the die.

The invention claimed is:

1. A die cleaning method for removing a forming-material from a die used in forming the forming-material constituted of clay containing a binder, comprising the steps of:

removing a part or all of the binder contained in the forming-material from the die; and removing the forming-material from the die after removing a part or all of the binder.

2. The die cleaning method according to claim 1, wherein the step of removing a part or all of the binder is performed by heating the die.

3. The die cleaning method according to claim 2, wherein a heating temperature is in a range of 200 to 500° C.

4. The die cleaning method according to claim 1, wherein the step of removing the forming-material is performed by spraying a fluid to the die at a pressure of 40 kg/cm$^2$ or less.

5. The die cleaning method according to claim 1, wherein the die includes a member constituted of cemented carbide.

6. The die cleaning method according to claim 1, wherein the die includes a member having slits.

* * * * *